United States Patent Office 3,476,746
Patented Nov. 4, 1969

3,476,746
11-OXYGENATED-10α-STEROIDS
Andor Fürst, Basel, and Marcel Müller, Frenkendorf, Switzerland, and Gabriel Saucy, Essex Fells, N.J., assignors to Hoffmann-La Roche Inc., Nutley, N.J., a corporation of New Jersey
No Drawing. Filed Jan. 30, 1967, Ser. No. 612,359
Claims priority, application Switzerland, Feb. 11, 1966, 1,981/66
Int. Cl. C07c *169/66, 167/16*
U.S. Cl. 260—239.55         12 Claims

ABSTRACT OF THE DISCLOSURE

8β,9β,10α,14α-11-oxo-steroids are selectively isomerized to 8β,9α,10α,14α-11-oxo-steroids which are useful as endocrinological agents and as intermediates for the preparation of other steroids.

BRIEF SUMMARY OF THE INVENTION

The molecule of a steroid contains at least five centers of asymmetry, i.e., at the 8-, 9-, 10-, 13-, and 14-positions. The normal, i.e., natural steroids contain the B/C/D-trans, anti, trans 8β,9α,10β,13β,14α-configuration. In recent years, there has been explored a different class of steroids, the so-called retro-steroids which contain a B/C/D-cis, anti, trans 8β,9β,10α,13β,14α-configuration (U.S. Patent No. 3,198,792, issued Aug. 3, 1965). These retro-steroids can be prepared either by processes involving photochemical means (U.S. Patent No. 3,198,792 supra) or by synthetic means commencing via degradation of normal steroids (Belgium Patent No. 663,197). Also, it is known that 11-oxo-5α,8β,9β,10α,13β,14α-estranes or 11-oxo-19-nor-5α,8β,9β,10α,13β,14α-pregnanes (i.e., A/B/C/D-cis, anti, trans 11-oxo-19-nor compounds or 19-nor-11-oxo-retro-steroids) are obtainable via treatment in an alkaline medium of 11-oxo-5α,8β,9α,-10α,13β,14α-estranes or 11-oxo-5α,8β,9α,10α,13β,14α-19-nor-pregnanes (i.e., A/B/C/D-cis, syn, trans, anti, trans compounds) (U.S. Patent No. 3,234,244, issued Feb. 8, 1966). Other B/C/D-trans, anti, trans compounds can be obtained by cumbersome multi-step techniques involving irradiation (Belgium Patent No. 634,693). The present invention embodies the surprising discovery that 11-oxo-Δ⁴-8β,9α,10α,13β,14α-steroids (i.e., B/C/D-trans, anti, trans compounds) can be obtained via treatment in an alkaline or acidic medium of 11-oxo-Δ⁴-8β,9β,10α,-13β,14α-steroids (i.e., B/C/D-cis, anti, trans compounds or 11-oxo-Δ⁴-retro-steroids). The products so-obtained are endocrinilogically useful and are also useful as intermediates for the preparation of other steroids.

DETAILED DESCRIPTION

This invention is concerned with 11-oxygenated (e.g., 11-oxo and 11-hydroxy-) steroids and to a process for their production. More particularly, this invention relates to 10α-steroids having an 11-oxo- or an 11-hydroxy group and a method for their preparation from 11-oxo-9β,10α-steroids.

By the term "10α-steroid," as employed herein is meant a steroid which differs from the steroids of the normal series (which exhibit the 8β,9α,10β,14α-configuration) with respect to the configuration at carbon atom 10, i.e., which possess the 8β,9α,10α,14α-configuration. Correspondingly, the term "9β,10α-steroid" refers to a steroid which exhibits a configuration at carbon atoms 9 and 10 which is opposed to that of the steroids of the normal series, i.e., has the 8β,9β,10α,14α-configuration.

The products of this invention are generally represented by the formula:

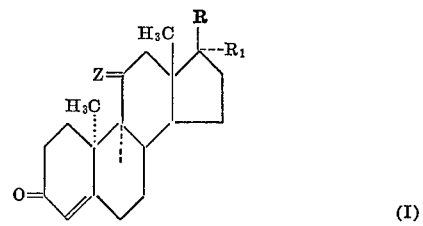

(I)

wherein Z is oxo or a free or esterified α- or β-hydroxy group and a hydrogen atom; R, when taken alone, is a free, esterified or etherified hydroxy group, an acetyl group or a hydroxyacetyl group (of which the hydroxy group can also be esterified or etherified); R¹, when taken alone, is hydrogen, alkyl, alkenyl or alkynyl and, where R represents acetyl or hydroxyacetyl, is also a free, esterified or etherified hydroxy group; and R and R¹, when taken together, are oxo, as well as those compounds wherein the 3-, 17- and/or 20-keto groups, as well as the 17- and 21-hydroxy groups, can be present in protected form.

A preferred group is represented by those compounds of general Formula I in which the oxygen function of an acetyl group represented by the symbol R is present in protected form when Z is oxo or a hydroxy group and a hydrogen.

The process in accordance with the invention is characteried in that a 9β,10α-steroid of the partial formula:

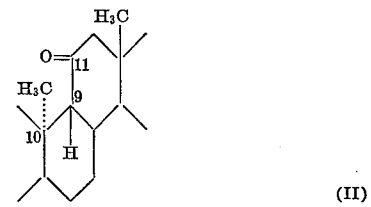

(II)

is rearranged into the corresponding 10α-steroid (e.g., a steroid of Formula I) by treatment with acids or bases.

The rearrangement is conveniently carried out in an inert organic solvent, such as alcohols, especially lower alkanols, such as methanol or ethanol; ethers, especially di(lower alkyl)-ethers such as diethyl ether, and 5- to 6-membered heterocyclic ethers such as dioxane or tetrahydrofuran; or in carboxylic acids, especially lower alkanoic acids such as acetic acid.

Acids which may be employed to effect the rearrangement of this invention are those organic and inorganic acids which possess sufficient acidity for the enolization of the 11-keto group. Examples of such acids are mineral acids such as hydrochloric acid or sulfuric acid; sulfonic acids such as p-toluenesulfonic acid; or formic acid.

Bases which can be employed include inorganic bases such as alkali metal hydroxides (e.g., potassium hydroxide or sodium hydroxide); or organic bases such as alkali metal-lower alkoxides (e.g., potassium or sodium methoxide or ethoxide and potassium tet.-butoxide); as well as benzyl tri-lower alkyl ammonium hydroxides such as benzyl trimethyl ammonium hydroxide.

The isomerization-promoting amount of acid or base employed to effect the isomerization of this invention is not narrowly critical. In general, however, the concentration of acid or base in the reaction mixture should be at least about 0.1%, with a concentration in the range of from about 0.1 to about 5% being preferred. Higher amounts can be employed but ordinarily are unnecessary.

The temperature at which the rearrangement is carried out is not critical; however, the rearrangement is preferably performed at room temperature.

The 10α-steroids which are obtained in accordance with this invention can be further transformed. For example, the 11-keto group can be reduced to an 11-hydroxy group which can thereafter be acylated.

As starting compounds for the process of this invention there are preferably used 9β,10α-steroids of the general formula:

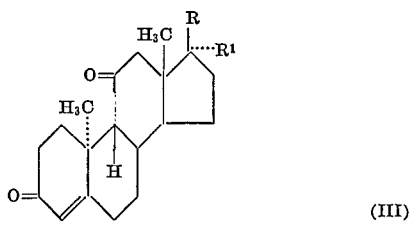

(III)

wherein R and R¹ are as defined above. These 9β,10α-steroids are all known compounds, and are disclosed, for example, in U.S. Patent No. 3,198,792, issued Aug. 3, 1965.

Keto groups may be protected in any manner known to the steroid art, such as by conversion to ketal groups such as the ethylene ketal (or ethylenedioxy) group. Steroids containing the 17α-hydroxy-20-keto-21-hydroxy grouping can be protected by conversion to their 17α,20; 20,21-bis(methylenedioxy)-derivatives, as by treatment with formaldehyde in an acidic medium.

An esterified hydroxy group represented by the symbols R or R¹, as well as an esterified hydroxy group in the 11- and/or 21-positions, is preferably derived from a saturated or unsaturated aliphatic or cycloliphatic, an araliphatic or an aromatic carboxylic acid having 1 to 20 carbon atoms. Examples of such acids are formic acid, acetic acid, pivalic acid, propionic acid, butyric acid, caproic acid, enanthic acid, oleic acid, palmitic acid, stearic acid, succinic acid, maleic acid, citric acid, benzoic acid, phenylacetic acid, and the like.

An etherified hydroxy group represented by the symbols R and R¹, as well as an etherified hydroxy group in position 21, is preferably derived from an aliphatic, cycloaliphatic or araliphatic group having 1 to 10 carbon atoms. Examples of such groups are methyl, ethyl, propyl, tert.-butyl, cyclopentyl, cyclohexyl, benzyl, and the like. As examples of etherified 17-hydroxy groups there can further be mentioned the cyclopenten-(1)-yloxy, the 1'-ethoxycyclopentyloxy and the tetrahydropyranyloxy groups.

The reduction of the 11-keto group in the 10α-steroids obtained in accordance with this invention can be undertaken by generally known techniques. For example, the reduction may be effected with a complex, alkali metal-Group III metal hydride such as lithium aluminum hydride or sodium borohydride, in which case 11β-hydroxy compounds are predominantly obtained. The reduction can also be carried out with an alkali metal, especially with lithium, in liquid ammonia. In this case, 11α-hydroxy compounds are prevalently obtained. Further keto groups present in the molecule are conveniently protected prior to the reduction of the 11-keto group. Such protection can be achieved by ketalization, as by conversion into an ethylene ketal. In this case, the rearrangement of the 9β,10α-steroid of Formula III is conveniently undertaken in the presence of the ketalizing agent, such as ethylene glycol/p-toluenesulfonic acid. After formation of the 11-hydroxy group, the protecting groups can be split off by generally known techniques, as by treatment of a ketal with acids such as mineral acids.

The acylation of an 11-hydroxy group can likewise be brought about by generally known techniques. For example, one may react the 11-hydroxy product with a reactive acid derivative (e.g., an acid chloride or anhydride) in the presence of an acid-binding agent (e.g., pyridine or an alkali hydroxide).

The 10α-steroids obtainable in accordance with the invention are in part hormonally (e.g., anabolically or gestagenically) active and represent intermediate products for the manufacture of pharmacologically valuable compounds, into which they can be converted, e.g. by dehydrogenation in 1(2), 6(7) or 9(11) position and/or introduction of substituents such as halogen atoms, alkyl or hydroxy groups into ring A and/or B in a manner known per se from the chemistry of the normal series of steroids.

The process products can be used as medicaments; for example, in the form of pharmaceutical preparations which contain them or their salts in admixture with a pharmaceutical, organic or inorganic inert carrier material which is suitable for enteral, percutaneous or parenteral application, such as, for example, water, gelatin, gum arabic, lactose, starch, magnesium stearate, talc, vegetable oils, polyalkylene glycols, Vaseline, etc. The pharmaceutical preparations can be submitted in solid form (e.g., as tablets, dragées, suppositories, capsules); in semi-solid form (e.g., as salves); or in liquid form (e.g., as solutions, suspensions or emulsions). They may be sterilized and/or contain additives such as preserving, stabilizing, wetting or emulsifying agents, salts for varying the osmotic pressure or buffers. They can also contain other therapeutically valuable materials.

In the following examples, the temperatures are given in degrees centigrade. The rotation values were taken in dioxane.

EXAMPLE 1

A mixture of 1.0 gram of 9β,10α-androst-4-ene-3,11,17-trione, 20 milliliters of benzene, 5 milliliters of ethylene glycol and 100 milligrams of p-toluenesulfonic acid was boiled under reflux for 30 hours, using a water separator. In order to complete the reaction, a further 2.5 milliliters of ethylene glycol and 50 milligrams of p-toluenesulfonic acid were added and the mixture was boiled for an additional 8 hours. The reaction solution was cooled, treated with 1 milliliter of triethylamine and very thoroughly shaken. After the addition of sodium bicarbonate solution, the mixture was extracted with ether. The extracts were washed with sodium bicarbonate solution, dried over potash, filtered and evaporated. The residue (1.33 grams of oil) crystallized on sprinkling with ether. Recrystallization from benzene/hexane/ether gave 0.680 gram of crude 3,3;17,17 - bis(ethylenedioxy) - 10α - androst-5-en-11-one, melting point 188–190°, as yellowish-colored crystals. This product was dissolved in benzene and filtered through a column of 7 grams of aluminium oxide. The eluate (647 milligrams of oil) was recrystallized from benzene/hexane, whereby 442 milligrams of analytically pure 3,3;17,17-bis(ethylenedioxy)-10α-androst-5-en - 11 - one was obtained as colorless rosettes. From the mother liquor, by chromatography on 50 grams of Kieselgel (elution with benzene/ether 10:1) and crystallization, there was obtained a further 303 milligrams, melting point 191–193° (from benzene/hexane); $[\alpha]_{589}^{25} = -150°$.

EXAMPLE 2

A mixture of 100 milligrams of 9β,10α-androst-4-ene-3,11,17-trione, 10 milliliters of toluene and 50 milligrams of p-toluene-sulfonic acid was boiled under reflux for 20 hours. After cooling, the mixture was diluted with ether and washed with sodium bicarbonate solution and water. The residue (106 milligrams) obtained in a manner similar to that described in Example 1 was purified by chromatography on aluminium oxide and then crystallized to yield 10α-androst-4-ene-3,11,17-trione, melting point 177–178° (from acetone/hexane); $[\alpha]_{589}^{25} = -163°$.

EXAMPLE 3

To a solution of 2.0 grams of 9β,10α-androst-4-ene-3,11,17-trione in 80 milliliters of benzene, there was added 10 milliliters of ethylene glycol and 200 milligrams of p-toluenesulfonic acid. The resulting mixture was heated at boiling for 3 hours, using a water separator. The crude product (2.42 grams of oil) obtained after work-up in a manner similar to that described in Example 1, was chromatographed on 240 grams of aluminium oxide with benzene/ether (9:1) as eluting agent. The crude 17,17-ethylenedioxy-10α-androst-4-ene-3,11-dione thus obtained was recrystallized from benzene/hexane to yield prisms of melting point 175–176° (from benzene/hexane); $[\alpha]_{589}^{25} = -249°$.

EXAMPLE 4

A solution of 1.65 grams of 9β,10α-pregn-4-ene-3,11,20-trione in 32 milliliters of benzene, after the addition of 16 milliliters of ethylene glycol and 160 milligrams of p-toluenesulfonic acid, was boiled under reflux for 22 hours using a water separator. The crude product (2.3 grams of oil) obtained after work-up in a manner analogous to Example 1, was chromatographed on 150 grams of Kieselgel. The benzene/ether (10:1) eluates (fractions 8–11, each 150 milliliters) were combined and yielded after evaporation 1.557 grams of oily 3,3;20,20-bis(ethylenedioxy)-10α-pregn-5-en-11-one. Fraction 10 (321 milligrams) was crystallized from ether/hexane at 0° after 5 days and yielded 158 milligrams of 3,3;20,20-bis(ethylenedioxy)-10α-pregn-5-en-11-one, melting point 146–148° (from acetone/hexane); $[\alpha]_{589}^{25} = -104°$.

EXAMPLE 5

100 milligrams of 9β,10α-pregn-4-ene-3,11,20-trione were isomerized in a manner similar to that described in Example 2 with p-toluenesulfonic acid in toluene. After chromatography on aluminium oxide with petroleum ether/benzene (1:9), benzene and benzene/ether (9:1) and crystallization from acetone/hexane, there was obtained 10α-pregn-4-ene-3,11,20-trione, melting point 202–203°; $[\alpha]_{589}^{25} = -169°$.

EXAMPLE 6

A solution of 5.2 grams of potassium hydroxide in 37 milliliters of water was added to a solution of 2.40 grams of 17,20;20,21-bis(methylenedioxy)-9β,10α-pregn-4-ene-3,11-dione in 150 milliliters of methanol. The mixture was held for 2 hours at room temperature, and then poured on ice water and extracted with methylene chloride. The organic extract was washed neutral with water, dried with sodium sulfate and the solvent evaporated in vacuum. The residue was chromatographed on 100 grams of silica gel. It was eluted with methylene chloride/acetone (98:2). The thin layer chromatographically uniform fractions (0.91 gram) were recrystallized twice from acetone/hexane and yielded 17,20;20,21-bis(methylenedioxy)-10α-pregn-4-ene-3,11-dione, melting point 193–194°; $[\alpha]_{589}^{25} = -277°$.

The starting material was manufactured as follows:

To a solution of 0.50 gram of 17,21-dihydroxy-9β,10α-pregn-4-ene-3,11,20-trione in 25 milliliters of chloroform there were added 10 milliliters of 40 percent formaldehyde solution and 10 milliliters of concentrated hydrochloric acid. The resulting mixture was stirred at room temperature for 5 hours, then poured on ice water and extracted three times with methylene chloride. The methylene chloride extracts were washed neutral with saturated sodium carbonate solution and water, dried with sodium sulfate and evaporated in vacuum. The residue (0.70 gram) was chromatographed on 30 grams of silica gel. The methylene chloride/acetone (98:2) fractions yielded, after recrystallization from acetone/hexane, 17,20;20,21-bis(methylenedioxy)-9β,10α-pregn-4-ene-3,11-dione, melting point 218–220°; $[\alpha]_{589}^{25} = -91°$.

EXAMPLE 7

A solution of 2.0 grams of 3,3;17,17-bis(ethylenedioxy)-10α-androst-5-en-11-one produced as described in Example 1, in 25 milliliters of tetrahydrofuran was added dropwise within 5 minutes under stirring and reflux to a freshly prepared solution of 1.5 grams of lithium in 100 milliliters of liquid ammonia. The mixture was rinsed with 25 milliliters of tetrahydrofuran and the blue reaction solution was stirred for a further 10 minutes. A mixture of 15 milliliters of methanol in 100 milliliters of ether was then added dropwise within 30 minutes, whereby a light-gray suspension resulted. After the addition of 15 grams of solid, dry ammonium chloride to the reaction mixture, the ammonia was distilled off. The resulting ethereal solution was washed three times with water, dried over sodium sulfate and evaporated. The residue was crystallized once from benzene/hexane, there being obtained 1.615 grams of 3,3;17,17-bis(ethylenedioxy)-11α-hydroxy-10α-androst-5-ene, melting point 198–199°; $[\alpha]_{589}^{25} = -152°$.

EXAMPLE 8

1.0 gram of 3,3;20,20-bis(ethylenedioxy)-10α-pregn-5-en-11-one produced as described in Example 4, in 50 milliliters of tetrahydrofuran was reduced in a manner similar to that described in Example 7 with 1 gram of lithium in 100 milliliters of ether. The crude product was crystallized from ether/hexane, there being obtained 855 milligrams of 3,3;20,20-bis(ethylenedioxy)-11α-hydroxy-10α-pregn-5-ene, melting point 171–172°;

$[\alpha]_{589}^{25} = -96°$

EXAMPLE 9

A mixture of 200 milligrams of 17,20;20,21-bis(methylenedioxy)-10α-pregn-4-ene-3,11-dione produced as described in Example 6, 4 milliliters of ethylene glycol, 2 milliliters of methylene chloride, 0.6 milliliter of orthoformic acid ethyl ester and 2 milligrams of p-toluenesulfonic acid was heated at 50° for 2½ hours. The resulting mixture was poured on ice cold dilute sodium carbonate solution and extracted with methylene chloride. The extract was washed neutral with water, dried with sodium sulfate and evaporated to dryness in vacuum. The crude 3,3-ethylenedioxy-17,20;20,21-bis(methylenedioxy)-10α-pregn-5-en-11-one was recrystallized from methylene chloride/isopropyl ether, melting point 233–236° (prisms); $[\alpha]_{589}^{25} = -176°$. Reduction of this compound with lithium in liquid ammonia in accordance with the process described in Example 7 yielded 3,3-ethylenedioxy-17,20;20,21-bis(methylenedioxy)-11α-hydroxy-10α-pregn-5-ene, melting point 233–234°; $[\alpha]_{589}^{25} = -196°$.

EXAMPLE 10

A solution of 3.0 grams of 3,3;17,17-bis(ethylenedioxy)-10α-androst-5-en-11-one produced as described in Example 1, in 50 milliliters of tetrahydrofuran was added dropwise within 30 minutes with ice cooling and stirring under nitrogen to a solution of 300 milligrams of lithium aluminium hydride in 30 milliliters of ether. After complete addition, the reaction mixture was stirred for 1 hour at 0°, and then 1½ hours at room temperature. Treatment with a concentrated solution of caustic soda and sodium sulfate (about 1:1) yielded 3.07 grams of solid 3,3;17,17-bis-(ethylenedioxy)-11β-hydroxy-10α-androst-5-ene as crude product. Melting point after recrystallization from benzene/hexane, 236–238° (colorless needles), $[\alpha]_{589}^{25} = -122°$.

EXAMPLE 11

3.0 grams of 3,3;20,20-bis(ethylenedioxy)-10α-pregn-5-en-11-one produced as described in Example 4, were reduced with lithium aluminium hydride in a manner similar to that described in Example 10. The crude product, after a single crystallization from benzene/hexane at 0°, gave 2.214 grams of 3,3;20,20-bis(ethylenedioxy)-11β-hydroxy-10α-pregn-5-ene, melting point 170–171°. After thin layer chromatography this preparation still contained a trace of a strongly polar compound and was therefore chromatographically purified on aluminium oxide. The benzene eluates (together 240 milligrams)

after crystallization twice from benzene/hexane, gave analytically pure 3,3;20,20-bis(ethylenedioxy)-11β-hydroxy-10α-pregn-5-ene (needles), melting point 173–174°; $[\alpha]_{589}^{25} = -83°$.

EXAMPLE 12

In a manner similar to that described in Example 10, 17,20;20,21 - bis(methylenedioxy)-10α-pregn-4-ene-3,11-dione produced as described in Example 6, was reduced with lithium aluminium hydride to 11β-hydroxy-17,20;20,21 - bis(methylenedioxy)-10α-pregn-4-en-3-one. After the usual work-up, there was obtained a crude crystallizate which, dissolved in chloroform, was stirred with manganese dioxide at 25° for 3 hours. The manganese salt was filtered off, the filtrate was evaporated to dryness and the residue was chromatographed on silica gel with methylene chloride/acetone (97:3). The thus-obtained 11β - hydroxy - 17,20;20,21 - bis(methylenedioxy) - 10α-pregn-4-en-3-one, after recrystallization from acetone/hexane, melted at 195–197°; $[\alpha]_{589}^{25} = -179°$.

EXAMPLE 13

(a) 200 milligrams of 3,3;17,17-bis(ethylenedioxy)-10α-androst-5-en-11-one produced as described in Example 1, were dissolved in 40 milliliters of acetone and, after addition of 20 milliliters of 1 N sulfuric acid, was allowed to react at room temperature for 20 hours and then at 50° for a further 2 hours. On evaporation of the reaction solution at room temperature to about 25 milliliters, 123 milligrams of crude 10α-androst-4-ene-3,11,17-trione crystallized out. Extraction of the filtrate with ether yielded a further 31 milligrams of hydrolysis product.

(b) 200 milligrams of 3,3;17,17-bis(ethylenedioxy)-10α-androst-5-en-11-one produced as described in Example 1, were boiled for one hour in a mixture of 10 milliliters of glacial acetic acid and 1 milliliter of water. By extraction with ether and working up the extract, there were obtained 170 milligrams of crude 10α-androst-4-ene-3,11,17-trione.

(c) The reaction products from (a) and (b) were combined and chromatographed on 32 grams of aluminium oxide. The benzene/ether (9:1) and (4:1) eluates (134 milligrams) were recrystallized from acetone/hexane and yielded pure 10α-androst-4-ene-3,11,17-trione.

EXAMPLE 14

1.0 gram of 3,3;17,17-bis(ethylenedioxy)-11α-hydroxy-10α-androst-5-ene produced as described in Example 7, was dissolved in 20 milliliters of acetone and, after the addition of 10 milliliters of 1 N sulfuric acid, allowed to stand at room temperature for 20 hours. By extraction with ether and working up the extract, there were obtained 431 milligrams of crude, solid 11α-hydroxy-10α-androst-4-ene-3,17-dione. Re-extraction of the wash water obtained in the working up with methylene chloride yielded a further 356 milligrams of 11α-hydroxy-10α-androst-4-ene-3,17-dione. Crystallization of the ether extract from acetone/hexane yielded 309 milligrams of 11α-hydroxy-10α-androst-4-ene-3,17-dione, melting point 206–207°; $[\alpha]_{589}^{25} = -211°$.

EXAMPLE 15

162 milligrams of 3,3;17,17-bis(ethylenedioxy)-11β-hydroxy-10α-androst-5-ene produced as described in Example 10, were hydrolyzed by allowing to stand for 4 days at room temperature in a mixture of 16 milliliters of acetone and 1.6 milliliters of 3 N sulfuric acid. By extraction with ether as described in Example 14, there were obtained 109 milligrams of crude 11β-hydroxy-10α-androst-4-ene-3,17-dione, which according to thin layer chromatography contained a slightly polar and a strongly polar side product. By chromatography on 10 grams of aluminium oxide [elution with benzene/ether (2:1) and (1:1)], and crystallization from acetone/hexane, there were produced 34 milligrams of analytically pure 11β-hydroxy-10α-androst-4-ene-3,17-dione, melting point 232–234°; $[\alpha]_{589}^{25} = -61°$.

EXAMPLE 16

500 milligrams of 3,3;20,20-bis(ethylenedioxy)-11α-hydroxy-10α-pregn-5-ene produced as described in Example 8, were hydrolyzed by allowing to stand for 16 hours in a mixture of 10 milliliters of acetone and 5 milliliters of 1 N sulfuric acid. The 11α-hydroxy-10α-pregn-4-ene-3,20-dione (392 milligrams of foam) obtained after work-up in a manner similar to that described in Example 14, was recrystallized for analysis twice from acetone/isopropyl ether and once more from isopropyl ether alone, melting point 167–196°; $[\alpha]_{589}^{25} = -176°$:

EXAMPLE 17

300 milligrams of 3,3;20,20-bis(ethylenedioxy)-10α-pregn-5-en-11-one produced as described in Example 4, were boiled under nitrogen for 2 hours in a mixture of 15 milliliters of glacial acetic acid and 3 milliliters of water. Work-up in a manner similar to that described in Example 13 yielded 230 milligrams of crude hydrolysis product, which was chromatographically purified on 7 grams of aluminium oxide. The petroleum ether/benzene (1:9), the benzene and the benzene/ether (9:1) eluates (altogether 8 fractions of 7 milliliters) together yielded 95 milligrams of 10α-pregn-4-ene-3,11,20-trione. By recrystallization twice from acetone/hexane, there was obtained analytically pure 10α-pregn-4-ene-3,11,20-trione, melting point 202–203°.

EXAMPLE 18

2.0 grams of 3,3;20,20 - bis(ethylenedioxy) - 11β - hydroxy-10α-pregn-5-ene produced as described in Example 11, were dissolved in 40 milliliters of acetone and, after the addition of 20 milliliters of 1 N sulfuric acid, allowed to react at room temperature for 16 hours and then at 50° for a further 6 hours. Work-up gave 1.363 grams of hydrolysis product. After chromatography on 70 grams of aluminium oxide [elution with benzene/ether (4:1) and (2:1)] and crystallization from acetone/hexane, there was obtained 11β-hydroxy-10α-pregn-4-ene-3,20-dione, melting point 213–215°; $[\alpha]_{589}^{25} = -39°$.

EXAMPLE 19

A solution of 0.70 gram of 17,20;20,21-bis(methylenedioxy)-10α-pregn-4-ene-3,11-dione produced as described in Example 6, in 35 milliliters of 60 percent formic acid was heated at 90° for 75 minutes. The reaction mixture was cooled to room temperature, poured on ice water and extracted with methylene chloride. After drying with sodium sulfate and evaporation of the solvent, there was obtained 0.7 gram of oil, which was stirred with a mixture of 0.7 gram of potassium carbonate, 35 milliliters of methanol and 8.5 milliliters of water at room temperature under nitrogen for 90 minutes. By extraction with methylene chloride and work-up of the extract, there was obtained 0.6 gram of crystalline product, which was chromatographed on 30 grams of silica gel. The ether/acetone (95:5) fractions yielded 310 milligrams of pure 17,21 - dihydroxy - 10α - pregn - 4 - ene - 3,11,20 - trione, melting point 222–224° (from acetone/hexane); $[\alpha]_{589}^{25} = -91°$.

EXAMPLE 20

Analogously to the process described in Example 19, from 3,3 - etheylenedioxy - 11α - hydroxy - 17,20;20,21 - bis(methylenedioxy) - 10α - pregn - 5 - ene produced as described in Example 9, there was obtained 11α,17,21-trihydroxy-10α-pregn-4-ene-3,20-dione, melting point 264–266° (from acetone); $[\alpha]_{589}^{25} = -205°$.

EXAMPLE 21

0.9 gram of 11β-hydroxy-17,20;20,21-bis(methylenedioxy)-10α-pregn-4-en-3-one produced as described in Example 12 was dissolved in 45 milliliters of 60 percent formic acid and heated at 60° for 2 hours. The resulting mixture was poured on ice water, extracted with ethyl acetate and washed neutral with sodium bicarbonate solution and water. There was obtained 0.8 gram of crystalline product which was chromatographed on silica gel. The ether/acetone fractions (95:5) yielded 350 milligrams of pure 11β,17,21-trihydroxy-10α-pregn-4-ene-3,20-dione, melting point 239–240° (from acetone/hexane); $[\alpha]_{589}{}^{25} = -67°$ (dioxane).

EXAMPLE 22

100 milligrams of 11α-hydroxy-10α-androst-4-ene-3,17-dione produced as described in Example 14, were dissolved in 5 milliliters of acetone and oxidized at room temperature for 2½ days with 0.20 milliliter of Jones' solution (J. Chem. Soc. 1946, 39). Extraction with methylene chloride and work-up of the extract gave 87 milligrams of crystalline crude product, which was purified by chromatography on 4.5 grams of aluminium oxide [elution with benzene/ether (9:1) and (4:1)] and crystallization from acetone/hexane, to yield 34 milligrams of 10α-androst-4-ene-3,11,17-trione, which according to thin layer chromatography, melting point and mixed melting point, was identical with the product of Example 13.

EXAMPLE 23

100 milligrams of 11β-hydroxy-10α-androst-4-ene-3,17-dione produced as described in Example 15, were oxidized with Jones' reagent in a manner analogous to Example 22. The product 10α-androst-4-ene-3,11,17 - trione was, according to thin layer chromatography, melting point and mixed melting point, identical with the product of Example 13.

EXAMPLE 24

50 milligrams of 11α-hydroxy-10α-pregn-4-ene - 3,20-dione produced as described in Example 16, in 2.5 milliliters of acetone were oxidized for 2½ days at room temperature by means of 0.1 milliliter of Jones' solution. The work-up yielded 50 milligrams of crude product, which was purified chromatography on 3 grams of aluminium oxide. The benzene/ether (9:1) and (4:1) eluates together yielded 21 milligrams of 10α-pregn-4-ene-3,11,20-trione. After crystallization from acetone/hexane, there was obtained a product which was shown to be identical with the substance obtained according to Example 17 according to thin layer chromatography, melting point and mixed melting point.

EXAMPLE 25

100 milligrams of 11β-hydroxy-10α-pregn-4-ene-3,20-dione produced as described in Example 18, in 5 milliliters of acetone were oxidized at room temperature for 20 hours with 0.2 milliliter of Jones' solution. The crude oxidation product (108 milligrams), after chromatographic purification on 5.5 grams of aluminium oxide with benzene/ether (9:1) and (4:1), gave a product which was shown by thin layer chromatography, melting point and mixed melting point, to be identical with the 10α-pregn-4-ene-3,11,20-trione obtained according to Example 17.

EXAMPLE 26

100 milligrams of 11α-hydroxy-10α-pregn-4-ene-3,20-dione produced as described in Example 16, were acylated by allowing to stand for 2½ hours in 1 milliliter of pyridine and 1 milliliter of acetic anhydride. The work-up yielded 121 milligrams of crude product (waxy) which was purified by chromatography on 3.6 grams of aluminium oxide. The benzene/ether (9:1), (4:1) and (2:1) eluates, after evaporation, together gave 80 milligrams of 11α-acetoxy-10α-pregn-4-ene-3,20 - dione, melting point 104–109° (from benzene/hexane); $[\alpha]_{589}{}^{25} = -171°$.

We claim:
1. In a process for producing a 10α-steroid of the formula:

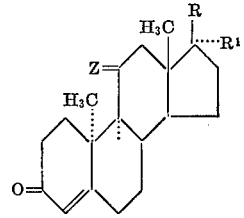

wherein Z is oxo or a free or esterified α- or β-hydroxy group and a hydrogen atom; R, when taken alone, is a free, esterified or etherified hydroxy group, an acetyl group of a hydroxyacetyl group (of which the hydroxy group can also be esterified or etherified); R¹, when taken alone, is hydrogen, alkyl, alkenyl or alkynyl and, where R represents acetyl or hydroxyacetyl, is also a free, esterified or etherified hydroxy group and is other than hydrogen; R and R¹, when taken together, are oxo; and such compounds wherein one or more oxo groups thereof are ketalized; the step of treating the corresponding 9β,10α-steroid wherein Z is oxo with an isomerization-promoting amount of an acid or a base.

2. The process as claimed in claim 1 wherein said 9β, 10α-steroid is treated with acid.

3. The process as claimed in claim 2 wherein said acid is p-toluenesulfonic acid.

4. The process as claimed in claim 1 wherein said 9β, 10α-steroid is treated with base.

5. The process as claimed in claim 4 wherein said base is potassium hydroxide.

6. The process for producing an 11α-hydroxy-10α-steroid as claimed in claim 1 which comprises reducing an 11-oxo-10α-steroid as claimed in claim 1 with an alkali metal in ammonia.

7. The process as claimed in claim 6 wherein said alkali metal is lithium.

8. The process for producing an 11β-hydroxy - 10α-steroid as claimed in claim 1 which comprises reducing an 11-oxo-10α-steroid as claimed in claim 1 with a complex alkali metal-Group III metal hydride.

9. The process as claimed in claim 8 wherein said hydried is lithium aluminium hydride.

10. The process as claimed in claim 8 wherein said hydride is sodium borohydride.

11. The process as claimed in claim 1 wherein the thus-obtained 11-oxo-10α-steroid is reduced with an alkali metal in ammonia to produce an 11α-hydroxy-10α-steroid.

12. The process as claimed in claim 1 wherein the thus-obtained 11-oxo-10α-steroid is reduced with a complex alkali metal-Group III metal hydride to produce an 11β-hydroxy-10α-steroid.

References Cited

UNITED STATES PATENTS 3,015,666   1/1962   Farkas et al. _____ 260—397.5
3,198,792   8/1965   Reerink et al. _____ 260—239.55

ELBERT L. ROBERTS, Primary Examiner

U.S. Cl. X.R.

260—397.3, 397.45, 999